United States Patent [19]

Okura

[11] 4,385,503
[45] May 31, 1983

[54] AIR CONDITIONING APPARATUS FOR VEHICLE

[75] Inventor: Eigi Okura, Konan, Japan

[73] Assignee: Diesel Kiki Company, Ltd., Tokyo, Japan

[21] Appl. No.: 254,724

[22] Filed: Apr. 16, 1981

[30] Foreign Application Priority Data

Apr. 21, 1980 [JP] Japan .................................. 55-52770

[51] Int. Cl.$^3$ ........................ F25D 17/00; F25B 29/00
[52] U.S. Cl. ...................................... 62/180; 165/16; 165/43
[58] Field of Search ...................... 165/16, 43; 236/49; 62/180, 186, 409

[56] References Cited

U.S. PATENT DOCUMENTS

| | | | |
|---|---|---|---|
| 3,887,127 | 6/1975 | Jauss | 165/16 X |
| 4,244,193 | 1/1981 | Haakenson | 165/16 X |
| 4,293,027 | 10/1981 | Tepe et al. | 165/16 X |

*Primary Examiner*—William E. Wayner
*Attorney, Agent, or Firm*—Jordan and Hamburg

[57] ABSTRACT

When a temperature inside a vehicle cabin is higher than a temperature outside the cabin, a full cooling mode of operation is started by moving an outside/-recirculated air selector door to a first position where 100% outside air will be supplied to replace the hotter inside air. When the inside temperature is lowered to substantially coincide with the outside temperature, the air selector door is shifted to a second position where the amount of outside air supply becomes 0%. As the inside temperature is further lowered to a level somewhat higher than a preset command level, the proportion of the outside air increases from 0% to a predetermined upper limit such as 30% little by little until it is fixed at 30% when the inside temperature settles at the reference temperature. A compressor is kept inoperative in the first stage of cooling operation in which the selector door is in the 100% outside air position.

7 Claims, 10 Drawing Figures

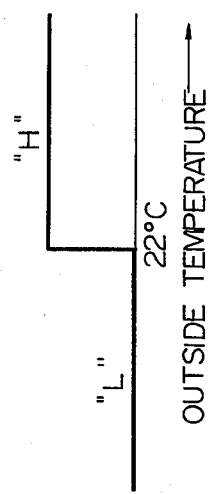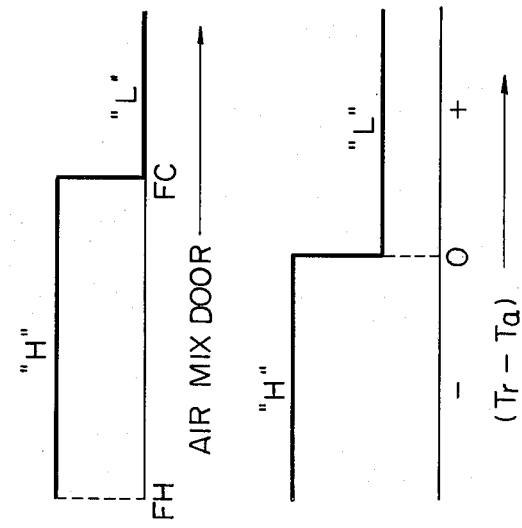
Fig. 5
Fig. 6
Fig. 7

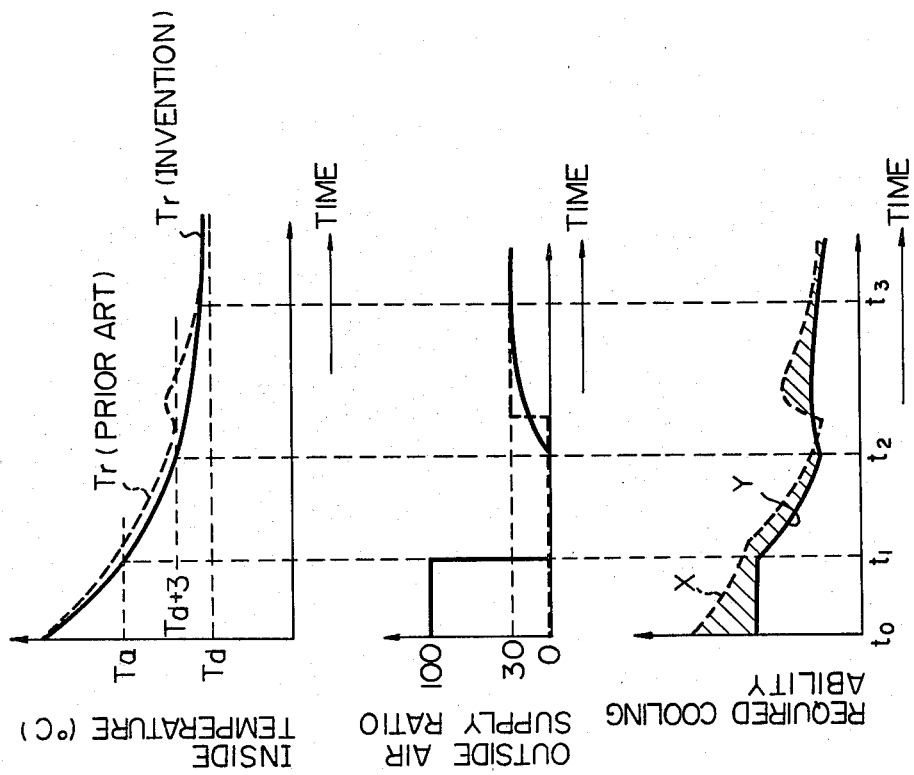

AIR CONDITIONING APPARATUS FOR VEHICLE

BACKGROUND OF THE INVENTION

The present invention relates to an air conditioning apparatus for a vehicle and, more particularly, to a system for controlling the amount of outside air introduced into a ductwork of the apparatus in a cooling mode of operation.

An air conditioning apparatus for a vehicle generally includes a blower to force air selected by an outside/recirculated air selector door into a ductwork. Air forced through the duct is cooled or heated and suitably proportioned by an air mix door which is swingable in the duct to control the air flow path. The proportioned air mixture is blown out of the duct into a cabin of the vehicle.

A prior art air conditioning apparatus of the type described above is operated in a cooler mode by first turning on a compressor operation switch to cool air in the duct which consists of recirculated air only. It is only after the temperature inside the vehicle cabin is lowered approximately to a preset level that outside air whose proportion is limited is introduced into the duct to be mixed with the recirculated air. This sudden supply of outside air, which will be hot, after the drop of the cabin temperature gives occupants of the vehicle unpleasant sensations. As is often the case with cars, the temperature in the vehicle cabin rises beyond the outside temperature level when the vehicle is left a long period of time under intense sunlight as in summer time. When the compressor is activated despite such a high temperature inside the vehicle cabin, it must work against an excessive load in an initial stage of the cooling operation and this will shorten its service life. Additionally, the apparatus needs a substantial period of time to cool off the air inside the cabin after being turned on. It will be apparent that the uneasy feelings caused by the aforesaid sudden supply of outside air in a cooling mode are more pronounced.

SUMMARY OF THE INVENTION

An air conditioning apparatus embodying the present invention comprises set means for setting a command inside temperature for a vehicle cabin, inside temperature sensor means for sensing an actual temperature inside the vehicle cabin, outside temperature sensor means for sensing a temperature outside the vehicle cabin, and operation control means for controlling an outside/recirculated air selector door means in response to outputs of the inner and outside temperature sensor means, the operation control means being constructed to, in a maximum cooling mode, introduce only outside air into an air flow duct when an actual inside temperature is higher than an outside temperature, reduce the amount of outside air supply down to zero when the actual inside temperature drops to a level substantially equal to the outside temperature, cool off recirculated air introduced into the duct in place of outside air by activating a cooler, increase the amount of outside air from zero when the actual inside temperature drops further to a level higher than a command inside temperature by a predetermined small degree until the amount of outside air reaches a predetermined upper limit, and cause the amount of outside air to settle at the upper limit when the actual inside temperature coincides with the command inside temperature.

In accordance with the present invention, when a temperature inside a vehicle cabin is higher than a temperature outside the cabin, a full cooling mode of operation is started by moving an outside/recirculated air selector door to a first position where 100% outside air will be supplied to replace the hotter inside air. When the inside temperature is lowered to substantially coincide with the outside temperature, the air selector door is shifted to a second position where the amount of outside air supply becomes 0%. As the inside temperature is further lowered to a level somewhat higher than a preset command level, the proportion of the outside air increases from 0% up to a predetermined upper limit such as 30% little by little until it is fixed at 30% when the inside temperature settles at the reference temperature level. A compressor is kept inoperative in the first stage of cooling operation in which the air selector door is in the 100% outside air position.

It is an object of the present invention to provide an air conditioning apparatus which attains a remarkable energy efficiency by saving the operation rate of a compressor.

It is another object of the present invention to provide an air conditioning apparatus which controls the temperature of air inside a vehicle cabin quickly to a preselected desired level.

It is another object of the present invention to provide an air conditioning apparatus which frees occupants in a vehicle cabin from unpleasant sensations attributable to sharp changes of temperature at an outlet of an air flow duct.

It is another object of the present invention to provide a generally improved air conditioning apparatus.

Other objects, together with the foregoing, are attained in the embodiment described in the following description and illustrated in the accompanying drawings.

BRIEF DESCRIPTION OF THE DRAWINGS

FIGS. 3–7 illustrate characteristics of outputs of various component elements included in the circuit of FIG. 2;

FIGS. 8a to 8c are graphs demonstrating a prior art and the present invention in a comparative way with respect to variations in temperature inside a vehicle cabin, proportion of outside air introduced into a vehicle cabin, and required cooling ability, respectively.

DESCRIPTION OF THE PREFERRED EMBODIMENT

While the air conditioning apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
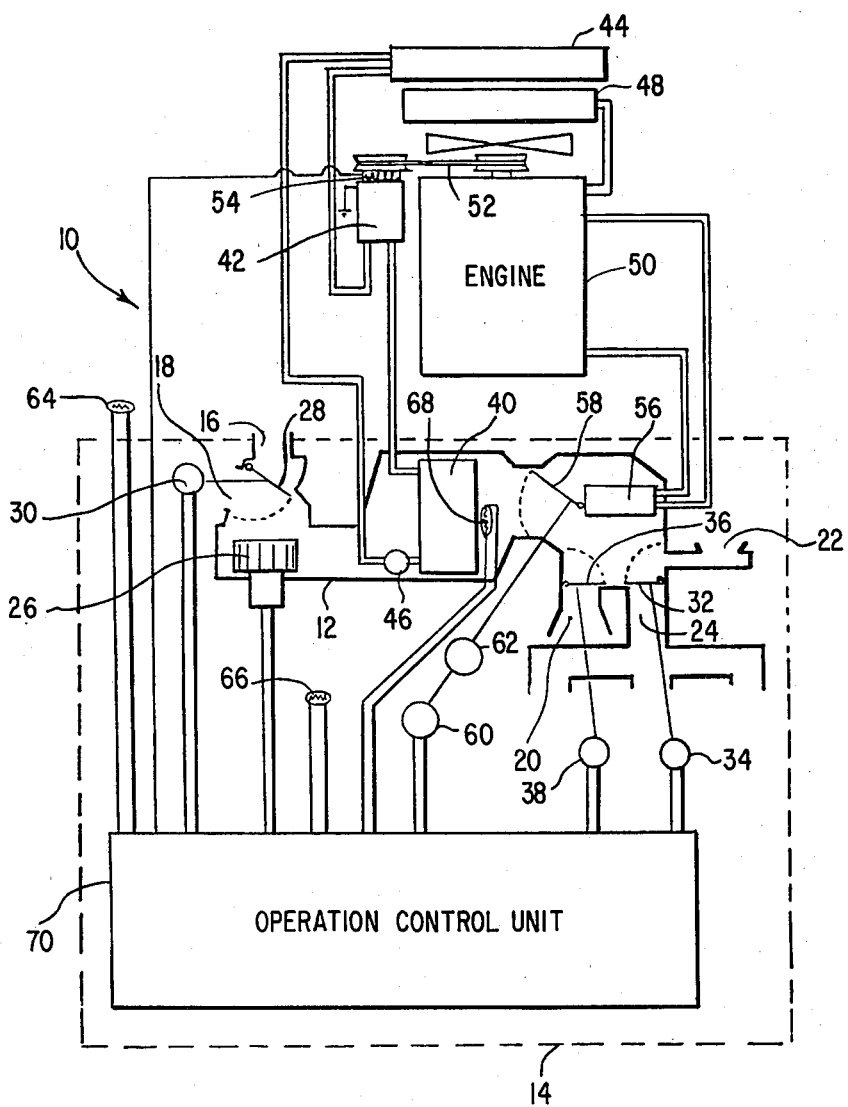
FIG. 1 is a schematic diagram of a known air conditioning apparatus for a vehicle to which the present invention relates.

Referring now to FIG. 1 of the drawings, an air conditioning apparatus for a vehicle embodying the present invention is generally designated by the reference numeral 10 and comprises an air flow duct 12 which leads into an enclosure such as a vehicle cabin 14. The duct 12 has an outside air inlet 16 and a recirculated air inlet 18 which communicate with the vehicle cabin 14. The duct 12 also has a lower outlet 20 opening into a lower portion of the vehicle cabin 14, a defroster outlet 22 opening to a front glass of the vehicle cabin 14, and a ventilation outlet 24 opening to an upper portion of the vehicle cabin 14. Air is forced from the air inlets 16 and 18 to the outlets 20, 22 and 24 by a blower 26. Air flow through the inlets 16 and 18 is controlled by an outside/recirculated air selector door or damper 28 by means of an actuator 30. Air flow through the outlets 22 and 24 is controlled by a door 32 by means of an actuator 34. Air flow through the outlet 20 is controoled by a door 36 by means of an actuator 38.

An evaporator or cooler 40 is disposed in the duct 12 for cooling air passing therethrough. The cooler 40 forms a cooling circuit in combination with a compressor 42, a condensor 44 and an expansion valve 46. The reference numerals 48 and 50 designate a radiator and an engine of the vehicle respectively. The compressor 42 is driven by the engine 50 through a belt 52 and an electromagnetic clutch 54. The clutch 54 is adapted to clutch and unclutch the compressor 42. A heater core 56 is disposed in the duct 12 downstream of the cooler 40. Hot water from the vehicle engine cooling system is passed through the heater core 56 to heat air passing through the duct 12. An air mix door 58 is movable by means of an actuator 60 to control the proportion of air passing through and around the heater core 56 and thereby the temperature of air discharged from the duct 12 into the vehicle cabin 14. Disposed between the air mix door 58 and the actuator 60 is a variable resistor 62 which is operatively connected to the air mix door 58.

An outside temperature sensor 64 is provided to sense the outside air temperature. An inside temperature sensor 66 senses the air temperature in the vehicle cabin 14. A cooler anti-freeze sensor 88 is disposed downstream of the cooler 40. The outputs of the sensors 64, 66 and 68 are connected to inputs of an operation control unit 70 which may comprise a microcomputer or discrete components. The construction or arrangement of the operation control unit 70 is shown in FIG. 2.

Figure 2:
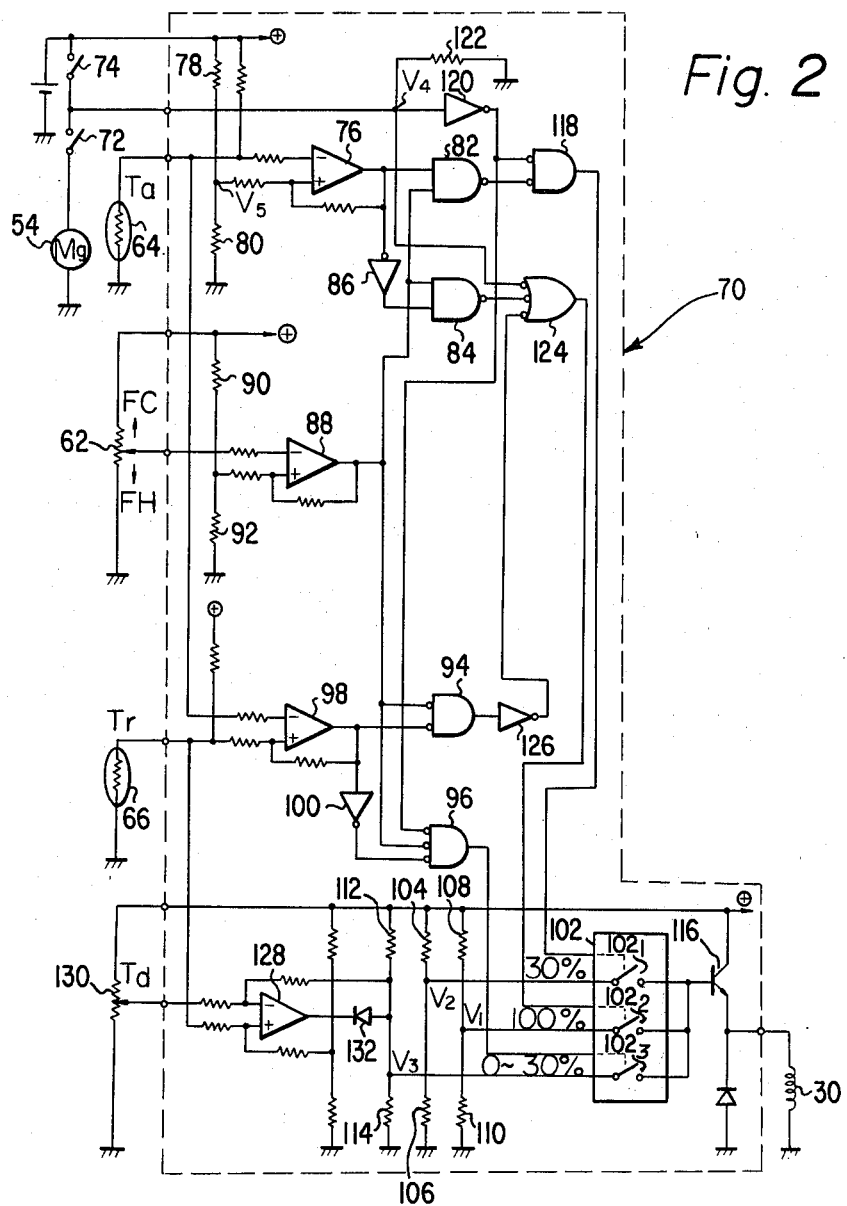
FIG. 2 is an electric circuit diagram showing a preferred embodiment of the present invention.

As shown in FIG. 2 of the drawing, the electromagnetic clutch 54 is connected with a cooler anti-freeze switch 72 of the sensor 68 which is in turn connected with a compressor control switch 74. An operational amplifier 76 has a non-inverting input terminal connected with a junction between two resistors 78 and 80 for voltage division. A divided voltage or reference voltage $V_5$ at this junction corresponds to a predetermined temperature of air such as 22° C. for the purpose which will be described. The outside temperature sensor 64 responsive to the temperature outside the vehicle cabin 14 is connected with an inverting input terminal of the operational amplifier 76. The output terminal of the operational amplifier 76 is connected to a NAND gate 82 and a NAND gate 84 through an inverter 86. A second operational amplifier 88 is connected at its non-inverting input terminal with the junction between two resistors 90 and 92 for voltage division. An inverting input terminal of the operational amplifier 88 is connected with a variable resistor 62 which is operatively connected with the air mix door 58. The output terminal of the operational amplifier 88 is connected to the NAND gates 82 and 84 on one hand and to NOR gates 94 and 96 on the other hand. The inside air temperature sensor 66 is connected to a non-inverting input terminal of a third operational amplifier 98 to supply an output signal indicative of an actual temperature in the vehicle cabin 14. The operational amplifier 98 receives an output signal of the outside temperature sensor 64 at its inverting input terminal. The operational amplifier 98 in this way compares output signal levels of the two sensors 64 and 66 and produces an output indicating a difference therebetween. This comparator output is coupled to the NOR gate 94 and the NOR gate 96 through an inverter 100.

Figure 3:
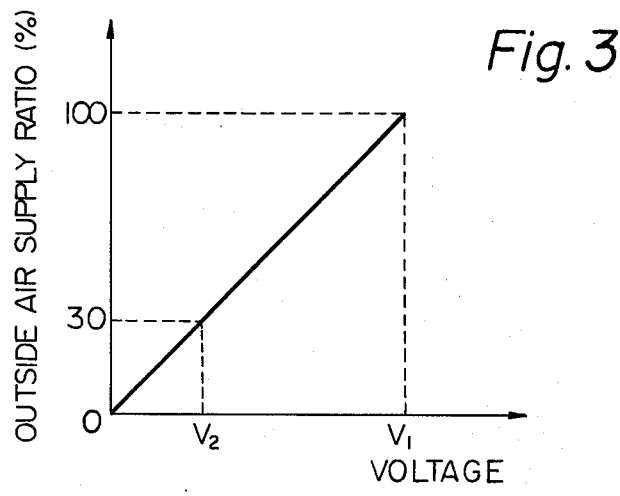

A block 102 indicates a set of first to third analog switches $102_1$, $102_2$ and $102_3$. The first switch $102_1$ is connected with voltage dividing resistors 104 and 106 which prepare a divided voltage $V_2$; the second switch $102_2$ is connected with voltage dividing resistors 103 and 110 which prepare a divided voltage $V_1$; and the third switch $102_3$ is connected with voltage dividing resistors 112 and 114 which prepare a divided voltage $V_3$. The other terminal of each of these switches are connected to the base of a transistor 116 which is connected with the actuator 30 adapted to drive the outside/recirculated air selector door 28. When the switch $102_2$ is closed, it will couple the voltage $V_1$ to the base of the transistor 116 to render the transistor 116 conductive whereby the actuator 30 is caused to move the outside/recirculated air selector door 28 to a position which introduces 100% outside air into the duct 12. When the switch $102_1$ is closed, the voltage $V_2$ lower than the voltage $V_1$ will be connected to the transistor 116 through the switch $102_2$ causing the actuator 30 to shift the air selector door 28 to a second position which establishes a limited amount of outside air supply, e.g. 30%. A graph shown in FIG. 3 demonstrates the relationship between the voltages $V_1$ and $V_2$ and the ratios of outside air supply. When the switch $102_3$ is closed, it will supply the transistor 116 with the voltage $V_3$ which builds up progressively from zero volt up to a certain predetermined level equal to the voltage $V_2$. Therefore, closing of the switch $102_3$ will increase the proportion of the outside air introduced progressively from 0% to 30%. The switch $102_1$ is operated by a NOR gate 118 which receives an output of an inverter 120 and an output of the NAND gate 82. The inverter 120 is adapted to invert a voltage $V_4$ appearing at the junction between the compressor operation switch 74 and a resistor 122. The switch $102_2$ is controlled by a NAND gate 124 which has three input terminals. A first input terminal of the NAND gate 124 receives the voltage $V_4$, a second input terminal receives an output of the NAND gate 84, and a third input terminal receives an output of the NOR gate 94 through an inverter 126. The switch $102_3$ is controlled by the NOR gate 96.

Figure 4:
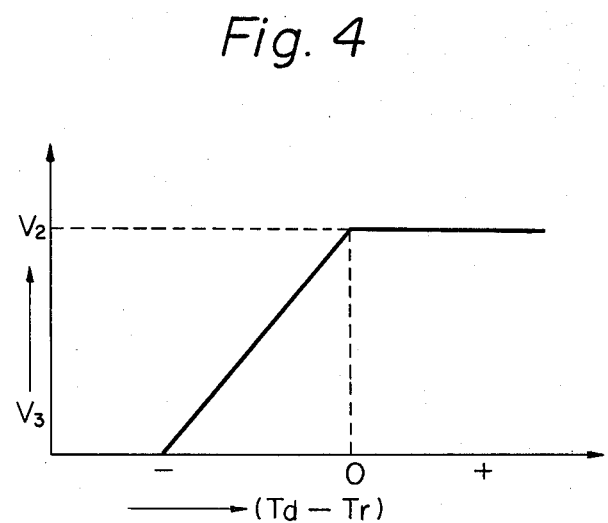

The control circuit 70 further includes a fourth operational amplifier 128 having a non-inverting input terminal connected with the inside temperature sensor 66 and an inverting input terminal connected with a variable resistor 130 which represents a command inside temperature setting section. An output of the operational amplifier 128 thus indicates a difference between an actual inside temperature and a preset command inside temperature and is applied to the cathode of a diode 132. The anode of this diode 132 is connected to the junction between the resistors 112 and 114. When the temperature inside the vehicle cabin 14 is lowered from a relatively high level to a preset command level, the output level of the inside temperature sensor 66 progressively increases accompanying a progressive increase in the output level of the operational amplifier 128. At the instant the output level of the operational amplifier 128 increases beyond the voltage divided by the resistors 112 and 114, the diode 132 will be turned off permitting the voltage $V_3$ to be saturated to the voltage $V_2$. However, the voltage $V_3$ builds up progressively from zero volt before it becomes saturated to the voltage $V_2$. Such a transition of the voltage $V_3$ is shown in FIG. 4 in which ($T_d - T_r$) indicates a difference between a preset sensor command inside temperature $T_d$ and an actual inside temperature $T_r$.

The air conditioning apparatus having the above construction will be operated as follows. Suppose that the temperature outside a vehicle cabin 14 is relatively high as in summertime and that the vehicle has been exposed to such hot air for a substantial period of time. Under this condition, the inside temperature $T_r$ usually rises higher than the outside temperature which will be denoted by $T_a$ hereafter. When a power source for the air conditioner is turned on to operate it in a maximum cooling mode, the operational amplifier 76 receives at its inverting input terminal an output voltage of the outside temperature sensor 64 which is lower than the reference voltage $V_5$ coupled to the inverting input terminal. It will be recalled that the reference voltage $V_5$ corresponds to a reference temperature of 22° C. for example. Comparing these inputs, the operational amplifier 76 produces a "H" output indicating that the outside temperature is higher than the reference level 22° C. (see FIG. 5). The operational amplifier 88 on the other hand produces a "L" output because the air mix door 58 in the duct 12 will then have been positioned in its maximum cooling position (see FIG. 6). Further, the operational amplifier 98 produces a "L" output because the input at the non-inverting terminal indicating the outside temperature $T_a$ is lower in level than the input at the inverting input terminal which shows the inside temperature $T_r$. The output of the NAND gate 82 is "H," that of the NAND gate 84 "H," that of the NOR gate 94 "H" and that of the NOR gate 96 "L." The output level of the NOR gate 118 is "L" and that of the NAND gate 124 "H." The "H" output of the NAND gate 128 closes the second switch $102_2$ so that the voltage $V_1$ is supplied therethrough to the transistor 116 which then operates the actuator 30 to set up a supply of 100% outside air while expelling the recirculated air out from the vehicle cabin 14. Consequently, the inside temperature $T_r$ of the vehicle cabin 14 is brought close to the outside temperature $T_a$ at an initial stage of the maximum cooling mode. More specifically, when the air conditioner is conditioned for a maximum cooling mode under the relationship between the temperatures mentioned above, i.e. $T_r > T_a$, only the outside air is introduced into the duct throughout an initial stage of the operation from time $t_0$ to time $t_1$ to replace the hot air in the vehicle cabin 14 therewith until the inside temperature $T_r$ drops down to a level substantially equal to the outside temperature $T_a$ as indicated by a solid curve in FIG. 8b. This is contrastive to a prior art cooling mode of operation which has activated a compressor 42 from the start despite the temperature relation $T_r > T_a$ without any outside air admitted into the duct 12. A dashed curve X in FIG. 8c indicates a cooling ability required for a prior art cooler mode whereas a solid curve Y indicates a cooling ability required for the present invention. It will be seen from the curves X and Y that the present invention in an initial stage of cooling mode saves the cooling ability and, therefore, operating rate of the compressor 42 by an amount indicated by a hatched area between the curves X and Y. Apart from this effect, the supply of 100% outside air in this stage of cooling operation drives the hot air out of the vehicle cabin 14 thereby lowering the inside temperature quickly by a substantial amount.

When the inside temperature $T_r$ is lowered to substantially coincide with the outside temperature level $T_a$ at time $t_1$, the output level of the inside temperature sensor 66 is low relative to that of the outside temperature sensor 64 to make the output level of the operational amplifier 98 "H." This "H" output is coupled to the NOR gate 94 and turns its output level to "L" whereby the output of the inverter 126 is made "H" to in turn change the output of the NAND gate 124 from "H" to "L" thereby turning off the second switch $102_2$. Then the supply of the voltage $V_1$ to the transistor 116 is cut off so that the actuator 30 returns the outside/recirculated air select or door 28 back to the 0% outside air position.

At time $t_1$, the compressor operation switch 74 is closed or, if it has been closed, the compressor 42 is activated. Due to the 0% outside air supply, only the air in the vehicle cabin 14 is recirculated through the duct 12 to be cooled off and blown back into the vehicle cabin 14. This time, all of the three inputs of the NOR gate 96 are "L" so that it closes the third switch $102_3$ connected therewith. The inside temperature $T_r$ further drops beyond the outside temperature $T_a$ until it reaches a level somewhat higher than a command inside temperature $T_d$ at time $t_2$. Said specific level may be one which is about 3° C. higher than a command inside temperature. Then, at time $t_2$, the voltage $V_3$ supplied through the switch $102_3$ to the transistor 116 builds up progressively from zero volt due to the operation of the operational amplifier 128 which compares the dropping actual inside temperature $T_r$ and the command inside temperature $T_d$. The transistor 116 therefore drives the actuator 30 such that the air selector door 28 moves progressively to increase the amount of outside air supply little by little from 0%. Stated another way, outside air is admitted into the duct 12 by a progressively increasing amount proportional to the voltage $V_3$ before the actual inside temperature $T_r$ coincides with the command inside temperature $T_d$ as represented by the solid curve in FIG. 8b. At time $t_3$, the voltage $V_3$ coupled to the transistor 116 is saturated to the voltage $V_2$ whereby the actuator 30 is caused to fix the air selector door 28 in its current position and thereby the amount of outside air supply at 30%. It has been a common practice to increase the supply of outside air suddenly from 0% to 30% as indicate by a dashed line in FIG. 8b after the fall of the actual inside temperature $T_r$ down to a level approximate to a command inside temperature $T_d$. This has resulted in a sharp change temperature at the outlet of the duct constituting a source of unpleasant sensations. In contrast, the gradual increase in the amount of outside air supply from 0% up to 30% according to the invention substantially succeeds in substantially precluding such a temperature change and thus ensuring a comfortable atmosphere in the vehicle cabin 14. Additionally, the sudden supply of outside air according to the prior art practice forces the compressor 42 to stand a sharp increase in the load and exert an increased cooling ability. According to the present invention, the compressor on-off control follows the relatively slow transition of the inside temperature and thereby prevents the inside temperature from rising sharply; the cooling ability required of the compressor is cut down with the operation rate thus reduced.

When the air conditioner is operated in a maximum heating mode for elevating the inside temperature $T_r$ to a command level $T_d$, the operational amplifier 88 compares an input from the variable resistor 62 linked with the air mix door 58 and the voltage at the junction between the resistors 90 and 92, coupling its "H" output to the NAND gates 82 and 84 and the NOR 94 and 96. Since the outside temperature $T_a$ is lower than the reference level 22° C. as will be usually so when an air conditioner is operated in the mode concerned, the operational amplifier 76 receiving an output of the outside air temperature sensor 64 produces a "L" output. If the compressor operation switch 74 has been turn on, the output level of the inverter 68 connected therewith is "L." Hence, the output level of the NOR gate 118 becomes "H" closing the first switch $102_1$ of the switch block. The voltage $V_2$ is therefore supplied through the switch $102_1$ to the transistor 116 to operate the actuator 30 such that 30% outside air is admitted into the duct by the air selector door 28. In this situation, optimumly heated air inclusive of the outside air will be introduced into the vehicle cabin 14.

In summary, it will be seen that the present invention provides an improved air conditioning apparatus which optimumly varies the amount of outside air supply in a maximum cooling mode by operating an outside/recirculated air selector door according to a transient relationship between an outside temperature, an inside temperature and a command inside temperature. Thus, the apparatus of the invention minimizes a required cooling ability of a compressor throughout every stage of a cooling operation thereby remarkably enhancing the energy efficiency. The apparatus also promotes quick cooling of air in a vehicle cabin and frees vehicle occupants from uneasy feelings attributable to a sharp change of the temperature at the outlet of a duct as has been experienced with a prior art air conditioning apparatus.

Various modifications will become possible for those skilled in the art after receiving the teachings of the present disclosure without departing from the scope thereof. For example, the function of the entire control circuit illustrated in FIG. 1 may be allotted to any other suitable means such as a microcomputer.

What is claimed is:

1. An air conditioning apparatus for a vehicle, including an air flow duct communicating with a vehicle cabin, an outside/recirculated air selector door means adapted to introduce outside air and recirculated air into the duct, and a cooler for cooling air in the duct, characterized by comprising:

set means for setting a command inside temperature for the vehicle cabin;

inside temperature sensor means for sensing an actual temperature inside the vehicle cabin;

outside temperature sensor means for sensing a temperature outside the vehicle cabin; and operation control means for controlling the air selector door means in response to outputs of the inside and outside temperature sensor means, the operation control means being constructed to, in a maximum cooling mode, introduce only outside air into the duct when an actual inside temperature is higher than an outside temperature, reduce the amount of outside air supply down to zero when the actual inside temperature drops to a level substantially equal to the outside temperature, cool off recirculated air introduced into the duct in place of outside air by activating the cooler, increase the amount of outside air from zero when the actual inside temperature drops further to a level higher than a command inside temperature by a predetermined degree until the amount of outside air reaches a predetermined upper limit, and cause the amount of outside air to settle at the upper limit when the actual inside temperature coincides with the command inside temperature.

2. An air conditioning apparatus as claimed in claim 1, in which the operation control means comprises computing means which processes outputs of the inside and outside temperature sensor means to compute an amount of outside air to be introduced into the duct.

3. An air conditioning apparatus as claimed in claim 2, in which the computing means comprises a first comparator to compare an output of the outside temperature sensor means with a predetermined reference voltage and a second comparator to compare an output of the inside temperature sensor means with an output of the outside temperature sensor means.

4. An air conditioning apparatus as claimed in claim 1, the operation control means comprises switch means which selectively supplies voltages to an actuator for driving the air selector door means to set up the three different supplies of outside air, respectively.

5. An air conditioning apparatus as claimed in claim 1, in which the amount of outside air supply settles at 30% as the upper limit when the actual inside temperature coincides with the command inside temperature.

6. An air conditioning apparatus as claimed in claim 1, in which the supply of outside air from zero to the upper limit is started when the actual inside temperature reaches a level about 3° C. higher than a command inside temperature.

7. An air conditioning apparatus as claimed in claim 4, in which the switch means comprises an analog switch assembly made up of three independent switch elements.

* * * * *